United States Patent [19]
Senanayake

[11] Patent Number: 5,527,216
[45] Date of Patent: Jun. 18, 1996

[54] CHIMNEY

[76] Inventor: Daya R. Senanayake, 9 Ecrin Place, Colombo 8, Sri Lanka

[21] Appl. No.: 338,587

[22] PCT Filed: Mar. 11, 1994

[86] PCT No.: PCT/IB94/00037

§ 371 Date: Nov. 14, 1994

§ 102(e) Date: Nov. 14, 1994

[87] PCT Pub. No.: WO94/20710

PCT Pub. Date: Sep. 15, 1994

[51] Int. Cl.$^6$ .................................................. E04H 12/28
[52] U.S. Cl. .................................................. 454/1; 52/2.21
[58] Field of Search ........................... 52/2.17, 2.21, 52/2.26; 454/1, 46, 47

[56] References Cited

U.S. PATENT DOCUMENTS

| | | | |
|---|---|---|---|
| 3,332,177 | 7/1967 | Sepp | 52/2.21 X |
| 3,489,072 | 1/1970 | Secor. | |
| 3,918,518 | 11/1975 | James | 52/2.21 X |
| 3,974,756 | 8/1976 | Long | 454/1 |
| 4,352,259 | 10/1982 | Smith et al. | 52/2.17 |

FOREIGN PATENT DOCUMENTS

| | | | |
|---|---|---|---|
| 2079477 | 11/1971 | France. | |
| 2522453 | 12/1975 | Germany | 52/2.26 |
| 2628029 | 12/1977 | Germany. | |
| 2640177 | 3/1978 | Germany. | |
| 280351 | 7/1990 | Germany. | |
| 3922846 | 1/1991 | Germany. | |
| 642461 | 1/1974 | U.S.S.R. | 454/1 |

Primary Examiner—Harold Joyce
Attorney, Agent, or Firm—Steven J. Hultquist

[57] ABSTRACT

A segmented chimney constructed from separate inflated chimney units mounted one on top of another. Each chimney unit has a segmented side wall, the segments being individually movable relative to the unit.

19 Claims, 2 Drawing Sheets

CHIMNEY

FIELD OF THE INVENTION

This invention relates to a chimney, and in particular to a chimney constructed from separate chimney units, and to the chimney units therefor.

BACKGROUND TO THE INVENTION

Chimneys are used in a variety of locations, and for a variety of applications. In particular, they may be used with a solar heat collector, the chimney containing one or more turbines to generate (electrical) power from the uprushing, solar heated, air or other gas. Alternatively, they may be used for other types of power generation, or with desalination plants and/or as emission and exhaust devices.

Traditionally, chimneys have been constucted of brick, concrete, steel or other reinforced or substantially rigid materials. Rigid construction methods are also used. These chimneys are expensive to construct and to maintain, and, due to the difficulty of supporting the weight of the chimney, are also limited in the height to which they can be built. Additionally, the problems of wind resistance and aerodynamic stability in the event of strong lateral winds limit the height of such chimneys.

DESCRIPTION OF THE PRIOR ART

In order to facilitate easier on-site construction, it has been proposed to construct chimneys from pre-fabricated chimney sections or units. One known design is that of French patent 2,079,479, which discloses a chimney made up of standard units mounted one upon another. The units are individually rigid.

As a means to reduce the weight of an erected chimney, U.S. Pat. No. 3,974,756 teaches a chimney constucted from individual chimney units, wherein each of the units is of flexible lightweight material. The assembled chimney is held erected by a balloon.

A lightweight chimney is disclosed in German patent 280,351, wherein the chimney is inflatable. The chimney disclosed in this patent has vertical partitions dividing the chimney into separate vertical sections.

However, whilst these known chimney arrangements seek to offer an easily constructed and/or lightweight chimney, so that in theory a very tall chimney could be constructed, these chimneys are substantially rigid, and suffer significant resistance to lateral impacting winds. This is a recognised disadvantage for those applications, such as solar collector chimneys, which would benefit from using a very tall chimney. The substantially rigid form of known chimneys leads directly to an upper limit on the useful height of such chimneys.

STATEMENT OF THE INVENTION

It is the object of the present invention to provide a chimney which avoids or reduces the above disadvantage, and which chimney is able to withstand a lateral wind of increased force, and which may usefully be constructed to a greater height.

Thus, we provide a chimney formed from separate units mounted one on top of another, each unit having an upstanding wall comprising separate segments, which segments are individually movable relative to the unit so as to flex resiliently inwardly under the action of a wind force. Having flexed one or more of the wall segments inwards, the wind can flow into an erected chimney to be deflected in an upward direction, towards the open mouth of the chimney.

Our proposal has the advantage that the chimney can be lightweight and inflatable, reducing the construction costs greatly. Additionally, because the segmented panels are flexed inwardly under the influence of wind forces, and deflect the air into the chimney and upwards towards its open end, the chimney can withstand high lateral wind forces, and, together with its lightness, this allows a chimney to be constructed up to heights of, for example, 10,000 meters, and perhaps more.

Because an impacting lateral wind is deflected into the chimney, and upwards towards the open end of the chimney, the performance of the chimney in strong wind conditions is enhanced.

The sectional construction of this chimney from separate units facilitates rapid construction.

BRIEF DESCRIPTION OF THE DRAWINGS

The invention will be further described, by way of example, with reference to the accompanying drawings, in which.

DETAILED DESCRIPTION OF THE PREFERRED EMBODIMENTS

Figure 1:
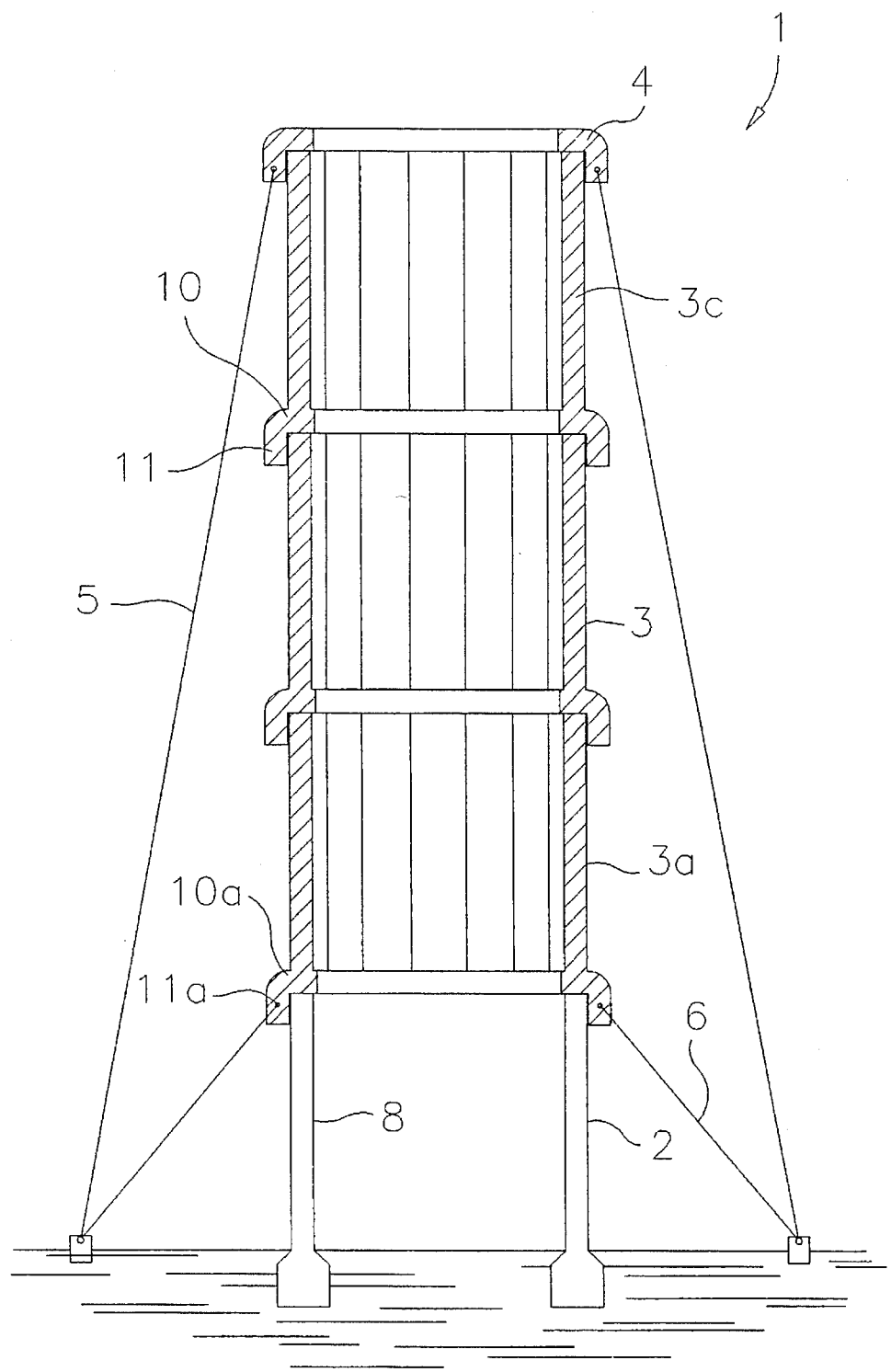
FIG. 1 is a side sectional view of a segmented floating chimney according to the invention.

The chimney 1 of FIG. 1 comprises a solid chimney mount 2, of concrete or other solid material, constructed at ground level. Typically, the chimney mount 2 will be apertured (not shown) to permit the entry of air into the chimney e.g. heated air from a solar collector. Additionally, the chimney mount may carry a turbine, caused to rotate by the upflowing airy and connected to an electrical generating system.

Located upon chimney mount 2 are three segmented chimney units 3. Mounted to the topmost chimney unit 3c is a securing ring 4; guy ropes 5 anchor the securing ring 4 to the ground, and thus prevent substantial lateral movement of the top of the chimney. Additionally, guy ropes 6 anchor the lowermost unit 3a to the ground. The guy ropes retain the chimney substantially vertical, but permit some degree of movement against strong lateral wind forces.

In other embodiments all of the chimney units are supported by guy ropes. Typically, the guy ropes will be of steel wire or nylon cord, though other suitable materials may be used.

Each of the chimney units 3 is inflatable, and has an annular tubular base 10 with a continuous lip 11 at its periphery. In use, the annular base of each unit will rest upon the unit 3 directly beneath it, and the lip 11 will surround the upstanding side wall of the lower unit, resisting lateral movement therebetween. The base 10a of the lowermost unit 3a will rest upon the chimney mount 2, and the lip 11a will surround the side wall of the mount 2.

Figure 2:
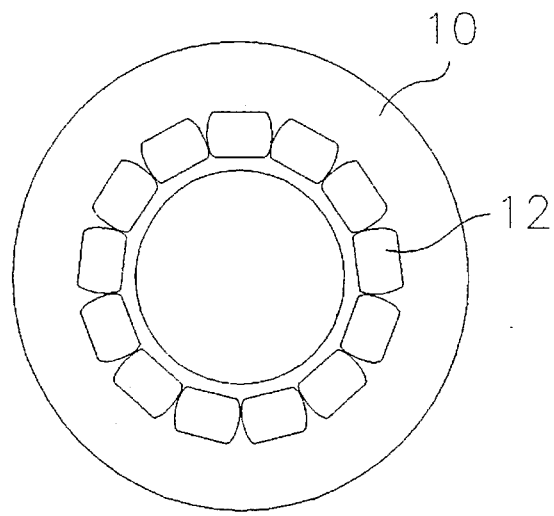
FIG. 2 is a plan view of one of the chimney units.
Figure 3:
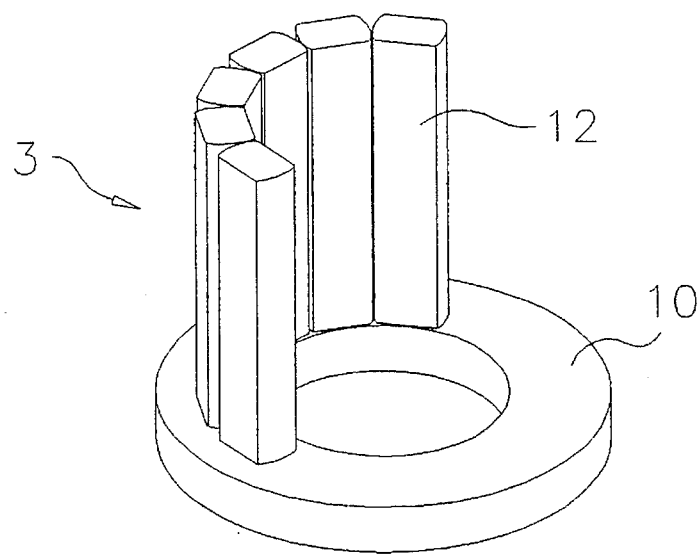
FIG. 3 is a partial perspective view of one of the chimney units, with some of the wall segments removed.
Figure 4:
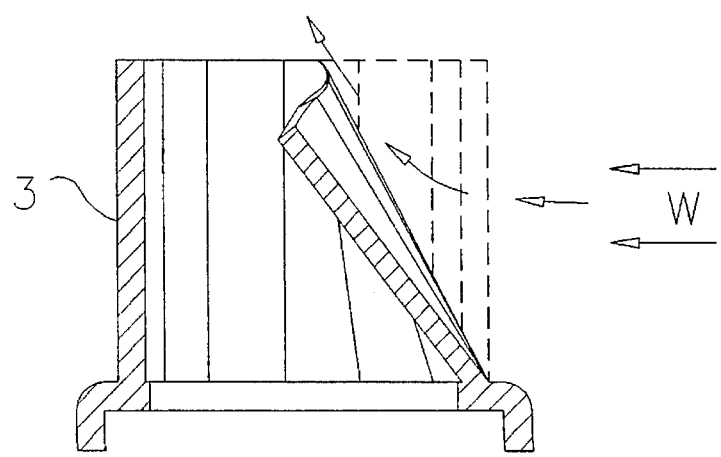
FIG. 4 is a side sectional view of one of the chimney units in the presence of an impacting lateral wind, with some of the wall segments in an inwardly flexed position.

As better seen in FIGS. 2 and 3, the side wall of each chimney unit comprises wall segments 12 which are independently connected to the annular base 10. The segments 12 are independently movable relative to the base 10, i.e. the material from which the chimney units are constructed, and the compressibility of the gas therein, allows the segments 12 to individually "pivot" adjacent their connection to the base 10. Thus, in the presence of lateral wind forces of sufficient strength, one or more of the segments may be resiliently flexed towards the central axis of the unit (FIG. 4).

As shown in FIG. 2, in this embodiment each segment has rounded sides, to provide substantially line contact with its adjacent segments. Also, each segment may flex towards the central axis of the unit without affecting other segments. In an alternative embodiment, the segments are wedge-like, so that in the presence of a strong impacting lateral wind, a single segment will engage its neighbours, so that several segments are caused to flex together.

To construct a chimney according to the invention, the segmented chimney units are inflated with hot-air, helium or hydrogen, for example, and located so that the lip 11a of the lowermost unit 3a fits around the side wall 8 of the chimney mount 2. Further segmented units are inflated and placed in position so that each unit has its lip 11 fitted closely over the side walls of the unit directly below it. The number of units used will determine the height of the chimney.

In an alternative embodiment, the segmented units are connected to each other by expandable connections, e.g. spring wires or elasticated ropes, so that adjacent units can move to a limited degree relative to one another, but remain substantially in place to form a continuous funnel for the chimney.

To permit re-inflation of the units, preferably to a specified pressure, each unit has an inflation valve inlet (not shown). These valve inlets may be connected to inflation tubes running down to ground level so that they can be inflated with hot air or other gas, pumped up from ground level. The units can be constantly or regularly re-inflated in this way, or intermittently re-inflated as and when necessary. Alternatively, they may be regularly or intermittently re-inflated from inflation units carried by a helicopter or small aircraft.

In an alternative embodiment, two or more inflation inlet valves may be provided for each unit, and the unit will be partitioned so that a leak from one partitioned region does not cause deflation of the entire unit. For example, the annular base may be partitioned off from the segmented side walls, and the segmented side walls may be separately partitioned into two or more separate inflation regions. This embodiment Would also permit different inflation pressures to be used in the different regions, e.g. a higher pressure might be desired in the annular base than in the wall segments.

The inside diameter of the floating chimney will conform to that required in the circumstances of its application, but can have a dimension in the range of from 1 meter to 1800 meters.

As seen in FIG. 4, the segments facing the wind flowing in a direction indicated by arrows W flex inwardly, deflecting the wind inwardly and upwardly of the chimney, towards its open exit end.

To avoid or reduce the possibility of wear occurring at the tip of the flexing segment and the underpart of the annular base, these parts can be locally strengthened e.g. by local thickening of the base and segment material. Alternatively, it can be arranged that the flexing segments do not touch the underpart of the adjacent annular base, the separation between adjacent units for example being maintained by non-flexing struts, of reduced cross section and offering low wind resistance.

In an alternative arrangement the segmented panels are suspended from adjacent upright columns. In this embodiment some or all of the panels do not need to be inflatable and inflated, or floating.

I claim:

1. A chimney comprising at least two separate chimney units mounted one on top of another, and including a topmost and lowermost unit, wherein each of said chimney units comprises a base and an upstanding wall comprising a plurality of separate segments mounted on the base, each of the segments being individually movable relative to the base.

2. A chimney according to claim 1, wherein each of the segments are mounted on the base to flex resiliently inwardly relative to a central axis of the unit thereby deflecting a lateral impacting wind upwards and inwards.

3. A chimney according to claim 1 wherein the lowermost unit is located upon a rigid mount.

4. A chimney according to claim 1, wherein tethering means attached to at least one of said base secure the chimney against substantial lateral movement.

5. A chimney according to claim 4, wherein the segments are inflatable and a securing ring is located upon the topmost chimney unit, and tethering means connect the securing ring to the ground.

6. A chimney according to claim 1, wherein the chimney units are interconnected by expandable connection means.

7. A chimney according to claim 1, wherein each chimney unit has an annular tubular base with a continuous lip depending therefrom.

8. A chimney according to claim 4, wherein each chimney unit has an inflation valve inlet, each inflation valve inlet being connected to a first end of a respective inflation tube, a second end of each respective inflation tube being connected to inflation means adjacent ground level.

9. A chimney according to claim 4, wherein each chimney unit is partitioned into a plurality of separate inflation regions.

10. A chimney according to claim 1, wherein the separate segments of each of said chimney units are of elongate shape and are vertically parallelly aligned with one another.

11. A chimney according to claim 1, wherein the separate segments of each of said chimney units are individually movable relative to the base so as to flex resiliantly inwardly under the action of a wind force.

12. A chimney according to claim 1, wherein the separate segments of the upstanding wall of each chimney unit have wall segment upper portions terminating in wall segment upper ends, and wherein the separate wall segments have a same height, for supporting another chimney unit mounted on top thereof.

13. A chimney according to claim 12, wherein the chimney unit mounted on top is arranged with its base supportively reposed on the wall segment upper ends of a next lower supporting chimney unit.

14. A chimney according to claim 13, wherein the base of the chimney unit mounted on top comprises a downwardly depending lip which surrounds the wall segment upper portions of the wall segments of the next lower supporting chimney unit.

15. A chimney according to claim 1, wherein each of the segments of a chimney unit are independently individually movable relative to the base of said chimney unit.

16. A chimney according to claim 1, wherein each of the segments of a chimney unit are dependently individually movable relative to the base of said chimney unit, with movement of one of said segments causing it to engage neighboring segments and move together with them, relative to the base.

17. A chimney according to claim 1, wherein the base of each chimney unit comprises a gas flow passage accomodating gas flow through the chimney.

18. A chimney according to claim 1, having a height in the range of from 1 meter to 1800 meters.

19. A chimney comprising an upstanding wall on a base and defining a gas conveying annulus, wherein said wall comprises a plurality of independent segments, each of said independent segments being individually deflectable inwardly towards the base.

* * * * *

UNITED STATES PATENT AND TRADEMARK OFFICE
CERTIFICATE OF CORRECTION

PATENT NO. : 5,527,216
DATED : June 18, 1996
INVENTOR(S) : "CHIMNEY"

It is certified that error appears in the above-indentified patent and that said Letters Patent is hereby corrected as shown below:

Column 2, line 46, change "airy and connected" to --air, and connected--.
Column 3, line 51, change "Would" to --would--.
Column 4, line 24, change "base" to --bases--.

Signed and Sealed this

Eighth Day of October, 1996

Attest:

BRUCE LEHMAN

Attesting Officer

Commissioner of Patents and Trademarks